(12) United States Patent
Nakajima et al.

(10) Patent No.: US 6,564,016 B1
(45) Date of Patent: *May 13, 2003

(54) METHOD FOR INDICATING FREE SPACE SIZE OF STORAGE MEDIUM

(75) Inventors: Nobuyoshi Nakajima, Kanagawa-ken (JP); Shuichi Ohtsuka, Kanagawa-ken (JP); Norihisa Haneda, Saitama-ken (JP); Kazuo Shiota, Tokyo (JP); Shinji Itoh, Kanagawa-ken (JP)

(73) Assignee: Fuji Photo Film Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/099,341

(22) Filed: Jun. 18, 1998

(30) Foreign Application Priority Data

Jun. 18, 1997 (JP) .............................................. 9-161659

(51) Int. Cl.$^7$ ............................................... G03B 17/24
(52) U.S. Cl. ......................... 396/311; 396/429; 355/40
(58) Field of Search ................ 396/310, 311, 396/315, 319, 321, 429; 355/27, 40, 41

(56) References Cited

U.S. PATENT DOCUMENTS

| 5,045,949 A | 9/1991 | Shiota | 358/244 |
|---|---|---|---|
| 5,434,838 A | 7/1995 | Haneda | 369/58 |
| 5,699,109 A | 12/1997 | Nishimura et al. | 348/96 |
| 5,706,050 A | 1/1998 | Nishimura et al. | 348/97 |
| 5,706,097 A * | 1/1998 | Schelling et al. | 355/40 |
| 5,715,034 A * | 2/1998 | Yamamoto | 355/40 |
| 5,748,284 A * | 5/1998 | Manico et al. | 355/39 |
| 5,754,221 A | 5/1998 | Nishimura et al. | 348/97 |
| 5,786,904 A * | 7/1998 | Narita | 358/487 |
| 5,825,467 A * | 10/1998 | Narita | 355/40 |
| 5,831,714 A * | 11/1998 | Yoshikawa | 355/40 |
| 6,147,703 A * | 11/2000 | Miller et al. | 348/220 |

* cited by examiner

Primary Examiner—David M. Gray
(74) Attorney, Agent, or Firm—Birch, Stewart, Kolasch & Birch, LLP

(57) ABSTRACT

In a digital output service of photographs, smooth operation of an additional recording service is aimed at by letting a user or an operator of a service provider easily understand the number of photographs addable to a storage medium. The free space size of a storage medium is detected each time new or additional recording therein is completed, and information regarding the free space size is indicated to a customer by being recorded on a recording medium corresponding to the storage medium, such as index print for the storage medium. On this occasion, the free space size is indicated as the number of films or exposures such as "6 25-exposure films" (6 (25 Exp)) or "160 exposures" (160) so that a user who is not familiar with expressions in bytes can readily understand it.

28 Claims, 3 Drawing Sheets

METHOD FOR INDICATING FREE SPACE SIZE OF STORAGE MEDIUM

BACKGROUND OF THE INVENTION

1. Field of the Invention

The present invention relates to a method for smoothly operating a digital output service wherein photographic image data are recorded in a CD-R or the like.

2. Description of the Related Art

A digital output service has been known wherein a photographic image is digitized by reading a developed film by using a film scanner and recorded in a storage medium such as a CD-R, a Zip disc, an MO (magnetic optical) disc or the like. Some service providers deal with photographs recorded by a digital camera in the same manner as photographs recorded on a film, and users of the digital output service have been increasing.

Most of storage media used in the digital output service generally have large capacities. For example, in the case of a CD-R, it can record image data for as many as 8 25-exposure films. However, image data for 8 films are generally not recorded at one time. At second and third uses of the service, image data are often added to the same storage medium as the one used for the first request. (Hereinafter this service is called an additional recording service.)

When the additional recording service is used, whether or not image data to be added can all be recorded in a storage medium is always a matter of concern. For example, a user wants to add image data if they can all be recorded in an existing storage medium, but may want to record all of them in a new storage medium if only a portion thereof could be added in the existing storage medium and the image data would resultantly be divided across two storage media. Alternatively, a user may reduce the amount of image data to be added by selecting only some of them if they could not all be recorded in an existing storage medium.

In the additional recording service, around 15-Mbyte of management information is recorded separately from the added image data at each additional recording. Furthermore, the data compression rate upon recording image data varies depending on the content of the image data. Therefore, data sizes upon recording may not necessarily be the same, even if original image data sizes are the same.

In other words, the free space size in one storage medium is not found by a simple calculation such as the capacity of one brand new storage medium minus a predetermined size times the number of data sets. The number of addable photographs has thus been very hard for a user to predict. Especially, for a user who is not familiar with digital expressions such as bytes, prediction of free storage space has been virtually impossible.

SUMMARY OF THE INVENTION

Based on consideration of the above problems, an object of the present invention is to aim at smooth operation of the additional recording service by letting a user or an operator of a service provider easily understand the number of photographs which can be added to a storage medium.

In FIG. 3, a method of the present invention for indicating a free space size of a storage medium is characterized by that at least one set of image data are recorded in a storage medium, and the remaining free space size of the storage medium is detected at the time of completion of the recording. In step S14, the detected free space size is recorded on a recording medium corresponding to the storage medium to be indicated thereby.

The "storage medium" means a CD-R, a Zip disc, an MO disc, a picture MD, or the like. The free space size of a storage medium means the usable area size thereof within the area wherein data can be recorded.

The time of completion of the recording means the time at which all image data requested to be added have been recorded completely. By this time, it is assumed that the management information or the like regarding the additional recording has been recorded.

The recording medium corresponding to the storage medium means a paper slip 17 on which the ID number of the storage medium is recorded, or a sticker 18 which is pasted on the storage medium, for example. Alternatively, the recording medium may be the storage medium itself. In other words, the free space size is recorded in the storage medium as free space size data and the free space size data are indicated to a user by being displayed on a monitor by a function of order processing software installed in a personal computer.

If an index print of all image data in a storage medium or of the image data having been added thereto is generated and provided to a customer, the index print may be used as the recording medium corresponding to the storage medium. In other words, the free space size may be indicated by being recorded in a blank space or the like of the index print.

It is preferable that the free space size recorded on an index print or the like is indicated as the number of films which can record the number of photographs equivalent to the number of image data sets addable in the storage medium, such as "4 25-exposure films", for example. Alternatively, it may be indicated as the number of image data sets addable to the storage medium, such as "40 exposures". However, these numbers are the numbers found in the case where no compression of image data is carried out for example, that is, the number of image data sets which are capable of being added. Therefore, in some cases, a larger number of image data sets than the indicated number can be added.

In the case of a storage medium such as a zip disc, it is preferable to record on the recording medium not only the free space size thereof but also the date of free space size detection. When additional recording services are carried out repeatedly on one storage medium and plural sheets of index prints on which the free space sizes have been recorded are handed to a customer, the customer may be confused in finding which information is the latest, since the available free space size may have been increased after data deletion by the customer. In the case of a CD-R, the free space size is reduced at any time of additional recording, and the latest free space size is easily understood.

In order to indicate the free space size of a storage medium to a customer based on the above method, means which detects and indicates the free space size only has to be added to an image data recording apparatus. In other words, an image data recording apparatus of the present invention records image data in a storage medium, and comprises image recording means which records the image data in the storage medium, free space size detecting means which detects the free space size of the storage medium, and free space size recording means which records the free space size detected by the free space size detecting means on a recording medium corresponding to the storage medium after completion of the recording by the image recording means.

The image data recording apparatus may further comprise index print generating means which generates an index print of the image data having been recorded in the storage medium and the free space size recording means may record the free space size on the index print. It is preferable for the free space size to be recorded as the number of films or exposures, as has been described above. Furthermore, it is also preferable for the date of free space size detection to be recorded.

The index print of the present invention is characterized by that it has the free space size of the storage medium recorded thereon. In other words, the index print is a sheet on which a plurality of photographic images have been recorded in the form of an array, and is characterized by that a plurality of photographic images having been recorded in a predetermined storage medium as image data and the free space size of the storage medium at the time of generation of the index print is recorded thereon.

According to the method of the present invention for indicating the free space size of a storage medium, a precise free space size can be indicated to a user, since the free space size is detected and recorded each time a first or additional recording on the storage medium has been completed. Furthermore, since the free space size indication is carried out by recording it on a recording medium corresponding to the storage medium, such as index print for the storage medium, the free space size of the storage medium is understood immediately when an additional recording is carried out on the storage medium. In this manner, smooth service operation can be performed.

Furthermore, in this method, the free space size is expressed by the number of films or exposures such as "4 25-exposure films" or "40 exposures". Therefore, a user who is not familiar with digital expressions such as bytes can readily understand the indication.

If not only the free space size but also the date of free space size detection are indicated, no confusion will occur even in the case of a storage medium such as a Zip disc which has possibility of free space size increase due to data deletion by a customer.

The image data recording apparatus of the present invention is a known image data recording apparatus but further comprises the free space size detecting means which detects the free space size of the storage medium and the free space size recording means which records the free space size of the storage medium on index print or the like. More specifically, the image data recording apparatus, as well as a printer which generates an index print or the like, can be realized as a portion of a photograph finishing system. According to this apparatus, since the free space size of a storage medium is recorded and output on a recording medium such as a sticker or index print, an operator only has to provide it to a customer.

The index print of the present invention is a print on which index images of image data recorded in a storage medium and the free space size of the storage medium are recorded, as has been described above. Therefore, a customer does not need to manage the record of the free space size of the storage medium intentionally, and by simply saving the index print, the free space size of the storage medium is understood instantaneously at the time of the next additional recording.

DESCRIPTION OF THE PREFERRED EMBODIMENT

Figure 1:
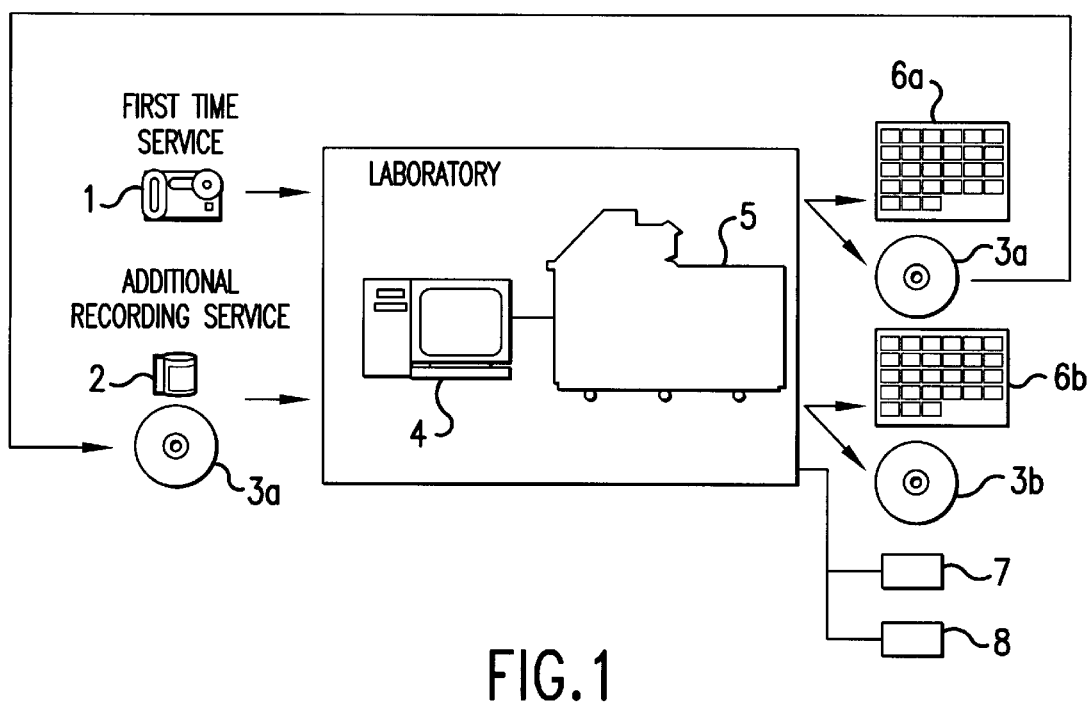
FIG. 1 is a diagram showing an outline of a digital output service.

Hereinafter, an embodiment of the present invention will be explained with reference to the accompanying drawings. FIG. 1 shows an outline of a digital output service.

A system configuration of a laboratory which carries out the digital output service will simply be explained first. However, this system is not a dedicated system for a digital output service but a photograph finishing system which generates a photograph print and comprises a function for digital output.

As shown in FIG. 1, this system comprises an image handling apparatus 4 and a photographic printer 5 connected to the image handling apparatus 4.

The image handling apparatus 4 is a general purpose personal computer with dedicated software installed therein, and comprises peripheral equipment or external interfaces such as a film scanner for reading a developed film, a cable interface connecting with a digital camera, a card reader for reading a memory card of the digital camera, and the like. The image handling apparatus 4 further comprises medium drives for a CD-R, a Zip disc or the like installed or externally connected.

The photographic printer 5 is a known digital photographic printer and outputs general photographic prints, index prints, photograph postcards, and the like, based on image data and output ordering information (such as the quantity and the size of print) received from the image handling apparatus 4.

After the image handling apparatus 4 carries out predetermined image processing on image data obtained from a digital camera 1 or a developed film 2, it transfers the image data to the photographic printer 5 and records the data in a storage medium 3 such as a CD-R. When the digital output service is requested, the photographic printer 5 generates an index print 6 on which only image data having been recorded in the storage medium are printed. When photographic print generation is also requested using the digital output service, the photographic printer 5 generates ordinary photographic prints based on the image data.

In the example shown in FIG. 1, digital output of photographs recorded by the digital camera 1 is requested at first, and an additional recording service regarding photographs in the developed film 2 is then requested at a second time.

In the first service, the image handling apparatus 4 obtains image data specified by a customer among image data recorded in a memory of the digital camera 1, and records the specified image data in a CD-R 3a. After all specified image data have been recorded, the image handling apparatus 4 records in the storage medium management information of the image data having been recorded and history information such as the date of recording. Such processing has been carried out in a conventional digital output service.

In the present invention, the image handling apparatus 4 then checks the free space size of the CD-R 3a. As has been described above, since the image handling apparatus 4 is a general purpose personal computer, the free space size can-be checked easily by a known function of an operating system thereof or the like. The image handling apparatus 4 calculates how many 25-exposure or 40-exposure films the free space size is equivalent to. At the same time, it also calculates how many exposures the free space size is equivalent to. This calculation is carried out according to the following equations (1) to (3):

The number of 25-exposure films equivalent to the free space size=$(M-C)/(A\times25)$ (1)

The number of 40-exposure films equivalent to the free space size=$(M-C)/(A\times40)$ (2)

The number of exposures equivalent to the free space size=$(M-C)/A$ (3)

where M means the free space size of the storage medium in Mbyte, A is a data size in Mbyte for each frame of an images or images, and C is a fixed data size used at each time of additional recording.

Figure 2:
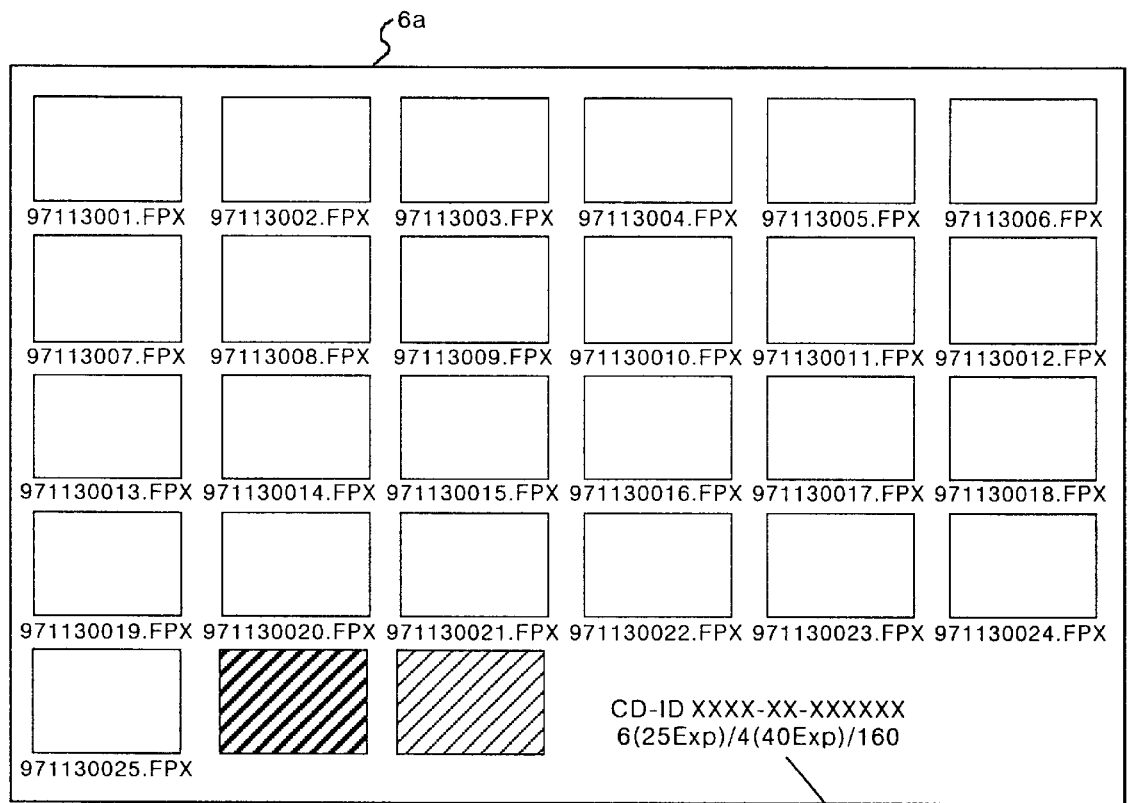
FIG. 2 is a diagram showing an embodiment of index print of the present invention.

The image handling apparatus 4 then transfers the number of films and exposures with the image data to the photographic printer 5 and orders generation of index print 6a. The photographic printer 5 records the number of films and exposures in a blank space of the index print upon generating the index print 6a. FIG. 2 is a diagram showing an example of the index print 6a whereon information 7 of the free space size of the storage medium has been recorded. "6 (25 Exp)" means the free space size of the storage medium is equivalent to 6 25-exposure films and "4 (40 Exp)" means it is equivalent to 4 40-exposure films. Furthermore, "160" means that it is equivalent to 160 exposures.

A customer saves this index print 6a with the storage medium 3a when he/she uses the service a first time. In this manner, when image data of the developed film 2 are added to the storage medium 3a the second time the service is used, it is instantaneously judged whether the additional recording in the storage medium 3a is possible or a new storage medium needs to be purchased, by confirming the information 7 regarding the free space size of the storage medium 3a.

The recording of the free space size of the storage medium on the index print is carried out in the same manner at an additional recording service. In the example shown in FIG. 1, the image data of the film 2 are added to the storage medium 3a and returned to the customer as a storage medium 3b. On this occasion, an index print 6b of the image data having been added is returned with the storage medium 3b, and the free space size of the storage medium 3b at the time of completion of adding image data of the film 2 has been recorded on the index print 6b.

A characteristic of the method of the present invention for indicating the free space size of a storage medium is that the free space size of the storage medium is indicated by detection thereof each time output service is carried out. Therefore, the recording medium on which the free space size is recorded is not only the index print but also various media such as a sticker pasted on a case of a CD-R, or a slip used for a digital output service.

Likewise, the CD-R in the above example is simply an example of a medium storing image data, but any media which are classified as large capacity removable media can be used. In the case of a storage medium whose data are erasable, it is preferable for the date of free space size detection or the date of digital output service request to be recorded together with the free space size.

Figure 3:
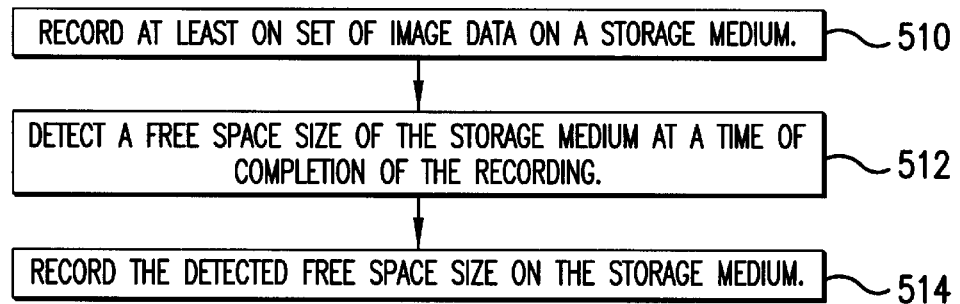
FIG. 3 is a flow chart of a method for indicating free space size in accordance with the invention.
Figure 4:
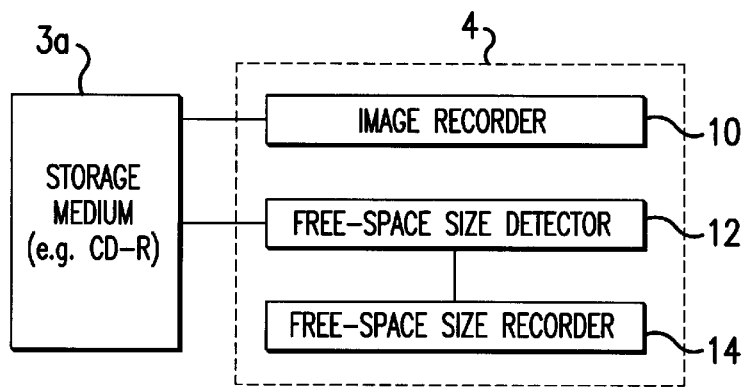
FIG 4 is a block diagram of an image data recording apparatus in accordance with the invention.

FIG. 3 shows an image data handling apparatus 4 of the present invention that comprises an image recorder 10, which records the image data in the storage medium (e.g., CD-R 3a); a free space size detector 12, which detects the free space size of the storage medium; and a free space size recorder 14, which records information 7 of the free space size detected by the free space size detector 14 on a recording medium corresponding to the storage medium after completion of the recording by the image recorder 10.

What is claimed is:

1. A method for indicating free space size of a portable storage medium predominately dedicated to the storage of image data, the method comprising:

retrieving image data from an image data source;

recording at least one set of image data retrieved from said image data source on the portable storage medium, thereby transferring data from said image data source to said portable storage medium;

detecting a free space size of the portable storage medium at a time of completion of the transferring of the at least one set of image data from said image data source to said portable storage medium; and indicating the detected free space size for visual display on a respective printable recording medium associated with the portable storage medium, thereby indicating availability of said portable storage medium for a subsequent transfer of an image data set.

2. The method as claimed in claim 1, further comprising the steps of:

generating an index print of the image data recorded on the portable storage medium for display by the recording medium corresponding to the portable storage medium and indicating the free space size on the index print.

3. The method as claimed in claim 1 further comprising indicating the free space size on the recording medium as a number of films with a first total recording capacity equivalent to a second total recording capacity of a number of image data sets addable to the portable storage medium.

4. The method as claimed in claim 1, further comprising indicating the free space size recorded on the recording medium as the number of image data sets addable to the portable storage medium.

5. The method as claimed in claim 1, further comprising recording the free space size and a date of free space size detection on the recording medium.

6. An image data recording apparatus for recording image data on a portable storage medium, removable from the image data recording apparatus, the image data recording apparatus comprising:

an input receiving image data from an image data source;

an image recorder for recording the image data received from said image data source on the portable storage medium, thereby transferring data from said image data source to said portable storage medium;

a free space size detector for detecting a free space size of the portable storage medium after the transferring of the image data from said image data source to said portable storage medium; and a free space size recorder for indicating the detected free space size for visual display on a printable recording medium associated with the portable storage medium, thereby indicating availability of said portable storage medium for a subsequent transfer of an image data set.

7. The image data recording apparatus as claimed in claim 6, further comprising:

index print generator for generating an index print for printing on the printable storage medium of the image data having been recorded in the portable storage medium, whereby the free space size recorder records the free space size on the index print.

8. The image data recording apparatus as claimed in claim 6, whereby the free space size recorder records on the recording medium the free space size as a number of films with a first total recording capacity equivalent to a second total recording capacity of number of image data sets addable to the portable storage medium.

9. The image data recording apparatus as claimed in claim 6, whereby the free space size recorder records on the recording medium the free space size as the number of image data sets addable to the portable storage medium.

10. The image data recording apparatus as claimed in claim 6, whereby the free space size and a date of free space size detection by the free space size detector are recorded on the recording medium.

11. The image data recording apparatus according to claim 6, further comprising:

an index print having a plurality of photographic images recorded in the form of an array or arrays on one sheet, said index print bearing a plurality of photographic images outputted from the portable storage medium, and information showing a free space size of the portable storage medium at a time of making the index print.

12. The apparatus as claimed in claim 11, wherein said information is a number which indicates a number of films with a first total capacity commensurate with a second total capacity of a number of image data sets addable to the portable storage medium.

13. The apparatus as claimed in claim 11, wherein said information indicates the number of image data sets addable to the portable storage medium.

14. The apparatus as claimed in claim 11 wherein a date when the free space size was detected is recorded on the sheet along with said free space size.

15. The apparatus of claim 6 wherein the recording medium comprises a paper for recording an identifier of the portable storage medium.

16. The apparatus of claim 6 wherein the recording medium comprises a sticker for adhering to the portable storage medium.

17. The apparatus of claim 6 wherein the recording medium comprises an index print.

18. The apparatus of claim 6 wherein the storage medium is selected from the group consisting of a CD-R, a Zip disk, a magneto-optical disk, a picture MD, an optical storage medium, and a magnetic storage medium.

19. The apparatus of claim 6 wherein the recording medium refers to at least a portion of the storage medium.

20. The method according to claim 1 further comprising the step of checking the free space size as a function of an operating system of a computer programmed for image handling.

21. The method according to claim 1 wherein the recording the detection of the free space size is expressed as a number of N-exposure benchmark films according to the formula:

$$f=(M-C)/(A\times N)$$

wherein f is the free space size, M is the total free space size of the portable storage medium in megabytes, C is the fixed data size used at each time of an additional recording, A is a data size in megabytes for each frame of at least one image, and N is the total number of exposures of the benchmark film.

22. A method for indicating free space size of a portable storage medium predominately dedicated to the storage of image data, the method comprising:

retrieving image data from an image data source;

recording at least one set of image data retrieved from said image data source on the portable storage medium, thereby transferring data from said image data source to said portable storage medium;

detecting a free space size of the portable storage medium at a time of completion of the transferring of the at least one set of image data from said image data source to said portable storage medium; and recording an indicator of the detected free space size on the portable storage medium to facilitate visual display of the detected free space size, thereby indicating availability of said portable storage medium for a subsequent transfer of an image data set.

23. The method as claimed in claim 22, further comprising the step of:

generating an index print of the image data recorded on the portable storage medium for display by the recording medium corresponding to the portable storage medium and indicating the free space size on the index print.

24. The method as claimed in claim 22, further comprising indicating the free space size on the recording medium as the number of films with a total recording capacity equivalent to the number of image data sets addable to the portable storage medium.

25. The method as claimed in claim 22 further comprising indicating the free space size recorded on the recording medium as the number of image data sets addable to the portable storage medium.

26. The method as claimed in claim 22 further comprising recording the free space size and a date of free space size detection on the portable storage medium.

27. The method according to claim 22 further comprising the step of checking the free space size as a function of an operating system of a computer programmed for image handling.

28. The method according to claim 22 wherein the recording of the detecting free space size is expressed as a number of N-exposure benchmark films according to the formula:

$$f=(M-C)/(A\times N)$$

wherein f is the free space size, M is the total free space size of the portable storage medium in megabytes, C is the fixed data size used at each time of an additional recording, A is a data size in megabytes for each frame of at least one image, and N is the total number of exposures of the benchmark film.

* * * * *